United States Patent
Ochiai et al.

(10) Patent No.: US 11,317,614 B2
(45) Date of Patent: May 3, 2022

(54) LINE GUIDE MECHANISM FOR SPINNING REEL

(71) Applicant: Shimano Inc., Osaka (JP)

(72) Inventors: Koji Ochiai, Osaka (JP); Hirokazu Hirayama, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 17/092,607

(22) Filed: Nov. 9, 2020

(65) Prior Publication Data

US 2021/0153487 A1 May 27, 2021

(30) Foreign Application Priority Data

Nov. 26, 2019 (JP) .............................. JP2019-213640
Oct. 26, 2020 (JP) .............................. JP2020-179211

(51) Int. Cl.
*A01K 89/01* (2006.01)
*A01K 89/015* (2006.01)

(52) U.S. Cl.
CPC ................................ *A01K 89/0175* (2015.05)

(58) Field of Classification Search
CPC ...... A01K 89/01082; A01K 89/011223; A01K 89/0176; A01K 89/0193
See application file for complete search history.

(56) References Cited

U.S. PATENT DOCUMENTS

| | | | |
|---|---|---|---|
| 2002/0096588 A1* | 7/2002 | Morise | A01K 89/0108 242/321 |
| 2002/0100828 A1* | 8/2002 | Sugawara | A01K 89/0108 242/231 |
| 2006/0027691 A1* | 2/2006 | Ochiai | A01K 89/0108 242/231 |
| 2019/0191681 A1* | 6/2019 | Ochiai | A01K 89/01082 |
| 2019/0350182 A1* | 11/2019 | Wong | A01K 89/0176 |

FOREIGN PATENT DOCUMENTS

JP          10-327718 A     12/1998

* cited by examiner

*Primary Examiner* — Emmanuel M Marcelo
(74) *Attorney, Agent, or Firm* — Global IP Counselors, LLP

(57) ABSTRACT

A line guide mechanism for a spinning reel includes a bail support member movably connected to one of the pair of rotor arms, a fixed shaft fixed to the bail support member, a line roller rotatably supported by the fixed shaft to guide the fishing line to the spool, a bail having an end supported by the bail support member via the fixed shaft to guide the fishing line to the line roller, a cover member on the end of the bail to cover a part of the line roller, and a projection member on the bail support member and having a line slack prevention portion including a first part extending in an axial direction of the fixed shaft and facing the line roller in a radial direction of the fixed shaft closer to an axis of the fixed shaft than an outer peripheral surface of the cover member.

11 Claims, 10 Drawing Sheets

LINE GUIDE MECHANISM FOR SPINNING REEL

CROSS-REFERENCE TO RELATED APPLICATIONS

This application claims priority to Japanese Patent Application Nos. 2019-213640, filed on Nov. 26, 2019 and 2020-179211, filed on Oct. 26, 2020. The entire disclosure of Japanese Patent Application Nos. 2019-213640 and 2020-179211 is hereby incorporated herein by reference.

BACKGROUND

Field of the Invention

The present invention relates to a line guide mechanism for a spinning reel.

Background Art

Conventional spinning reels can include a line guide mechanism for guiding fishing line on to a spool. The line guide mechanism is movably connected to a pair of rotor arms. The line guide mechanism includes a bail, a pair of bail support members, a fixed shaft and a line roller. The bail is supported by the bail support members and guides the fishing line on to the line roller. The bail support members are movably connected to the rotor arms. The line roller is rotatably supported by the fixed shaft and guides the fishing line to the spool (See Japanese Published Unexamined Application No. H10-327718).

When the fishing line is guided to the spool by the line roller, if sufficient tension is not applied to the fishing line, the fishing line can separate from the line roller and slack in the line can occur. Additionally, it is possible for the fishing line to become entangled on the spool or the bail support members. In order to solve this problem, Japanese Published Unexamined Application No. H10-327718, for example, discloses a prevention member disposed on a bail support member that can prevent slack from forming in the fishing line.

SUMMARY

It has been determined that, for spinning reels, an improved line guide mechanism that reduces the occurrence of slack in a fishing line is desired.

Thus, an object of the present invention is to provide a line guide mechanism for a spinning reel, that reduces the occurrence of slack in a fishing line.

The line guide mechanism for a spinning reel according to one aspect of the present invention is movably connected to a pair of rotor arms and guides a fishing line to a spool. The line guide mechanism includes a bail support member, a fixed shaft, a line roller, a bail, a cover member and a projection member. The bail support member is movably connected to one of the pair of rotor arms. The fixed shaft is fixed to the bail support member. The line roller is rotatably supported by the fixed shaft and guides the fishing line on to the spool. An end of the bail is supported by the bail support member via the fixed shaft and the bail guides the fishing line to the line roller. The cover member is disposed on the end of the bail and covers a part of the line roller. The projection member is disposed on the bail support member. The projection member has a line slack prevention portion. The line slack prevention portion includes a first part extending in the axial direction of the fixed shaft and arranged facing the line roller in the radial direction of the fixed shaft at a position closer to the axis of the fixed shaft than the outer peripheral surface of the cover member.

In this embodiment of a line guide mechanism, the first part of the line slack prevention portion is arranged facing the line roller at the position closer to the axis of the fixed shaft than the outer peripheral surface of the cover member. This structure enables the gap between the line roller and the slack prevention portion to be relatively narrow. As a result, a fishing line that separates from the line roller is pulled by the line slack prevention portion, and thus, the fishing line is prevented from being wound around the spool in a looped condition. As can be understood, this embodiment provides a line guide mechanism for a spinning reel, with which line slack is less likely to occur.

The line slack prevention portion can have a finned shape and can be capable of bending when pushed by the fishing line. In this embodiment, a knot that is in the fishing line can be prevented from becoming caught in the gap between the line roller and the line slack prevention portion.

The shortest distance between the line roller and the first part can be equal to or less than 1 mm. In this embodiment, it is possible to further prevent the fishing line from being wound around the spool in a looped condition.

The bail support member can include a groove that extends in the axial direction of the fixed shaft. The projection member can further include an insertion part to be inserted into the groove and be removably attached to the bail support member. In this embodiment, it is possible to attach a separate projection member with a different length to the bail support member. That is, it is possible to adjust the gap between the line roller and the line slack prevention portion, therefore, it is possible to effectively suppress line slack when the diameter of the fishing line to be used is changed.

The insertion part can be press-fitted into the groove. The projection member can further include a hook part to which a tool can be hooked. The tool can be used to pull out the insertion part from the groove. In this embodiment, it is possible to easily attach/detach the projection member to/from the bail support member.

The line guide mechanism can further include a stopper, which is inserted into the bail support member from a different direction than the axial direction of the fixed shaft. The stopper can prevent the insertion part from falling out of the groove. In this embodiment, it is possible to prevent the projection member from falling off of the bail support member with a simple structure.

The stopper can be a pin member that has a head part. The head part can be held between the mating surfaces of the rotor arm and the bail support member. In this embodiment, the number of components can be reduced, and the appearance can be improved.

One of the bail support member and the projection member can have a protrusion projecting in a direction different from the axial direction. The other one of the bail support member and the projection member can have a hole into which the protrusion fits. The connection between the hole and the protrusion can prevent the projection member from falling off of the bail support member. In this embodiment, it is possible to prevent the projection member from falling off of the bail support member with a simple structure.

The projection member can further comprise an arm formed to clasp a part of the bail support member on one end of the insertion part. The bail support member can have an engaging part with which the end of the arm engages. In this embodiment, it is possible to prevent the projection member from falling off of the bail support member with a simple structure, and the projection member can be easily attached to and detached from the bail support member.

The projection member can further comprise a second part arranged facing the cover member at a position farther from the axis of the fixed shaft than the first part in the radial direction of the fixed shaft. In this embodiment, since the second part is arranged facing the cover member, it is possible to prevent the fishing line which has separated from the line roller from becoming entangled with the bail support member or the spool.

The shortest distance between the cover member and the second part can be equal to or less than 1 mm. In this embodiment, it is possible to further prevent the fishing line from being wound around the spool in a looped condition.

According to this invention, it is possible to provide a line guide mechanism of a spinning reel, that is less likely to cause line slack.

DETAILED DESCRIPTION OF EMBODIMENTS

Figure 1:
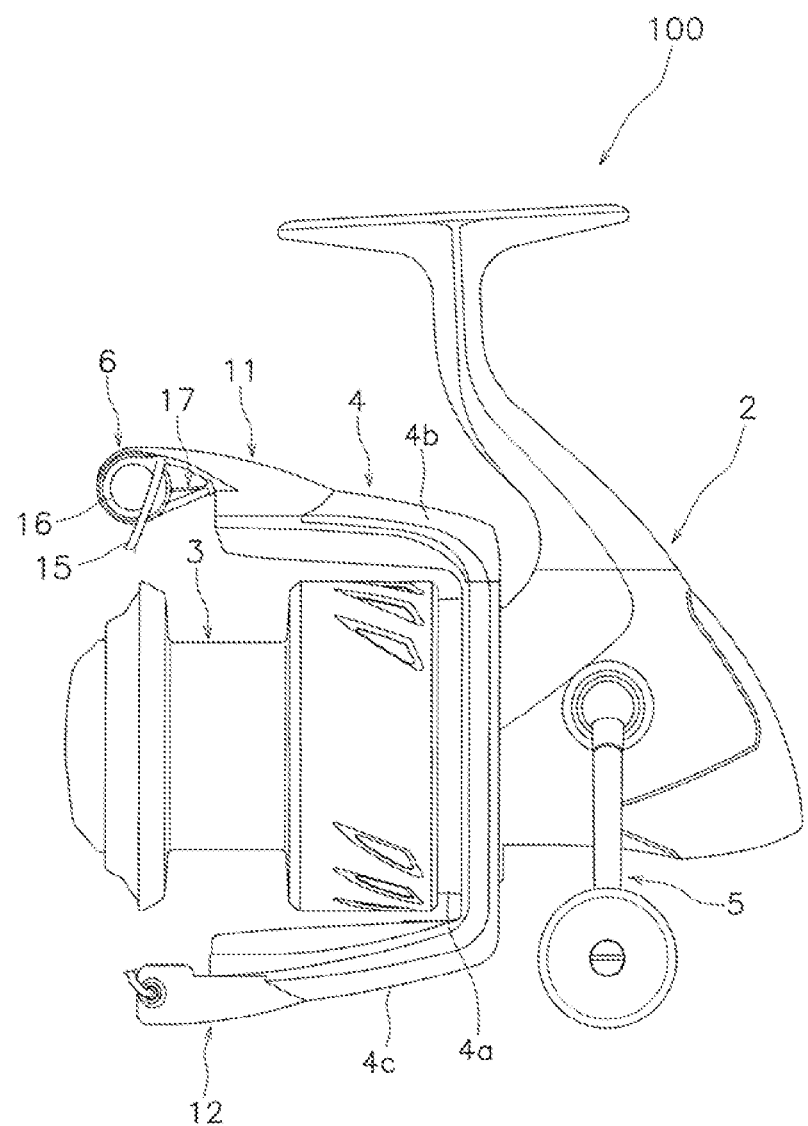
FIG. 1 is a vertical cross-sectional view of a spinning reel in which one embodiment of the present invention is adopted.

FIG. 1 is a longitudinal sectional view of a spinning reel 100 in which one embodiment of the present invention is illustrated. The spinning reel 100 includes a reel body 2, a spool 3, a rotor 4, a handle 5 and a line guide mechanism 6.

The reel body 2 has an internal space and an oscillating mechanism, a rotor driving mechanism, and the like, are housed in the internal space.

The spool 3 has an outer periphery around which a fishing line is wound. The spool 3 reciprocates the reel body 2 in the front-rear direction accompanied with the rotation of the handle 5.

The rotor 4 winds the fishing line around the spool 3. The rotor 4 includes a rotor body 4a, a first rotor arm 4b and a second rotor arm 4c. The first rotor arm 4b and the second rotor arm 4c are one example of a pair of rotor arms, and are formed at positions facing each other with the rotor body 4a interposed therebetween on a side of the rotor body 4a. The rotor 4 rotates around the center axis of the spool 3 accompanied with the rotation of the handle 5.

The handle 5 is rotatably supported by the reel body 2.

The line guide mechanism 6 rotates around the center axis of the spool 3 along with the rotor 4 and guides the fishing line to the spool 3. The line guide mechanism 6 is movably connected to the first rotor arm 4b and the second rotor arm 4c so as to take a line-winding position and a line-release position. As can be understood, the line-winding position is a position in which the fishing line is wound on the spool 3 and the line-release position is a position in which the fishing line wound on the spool 3 is played out (e.g., casted).

Figure 2:
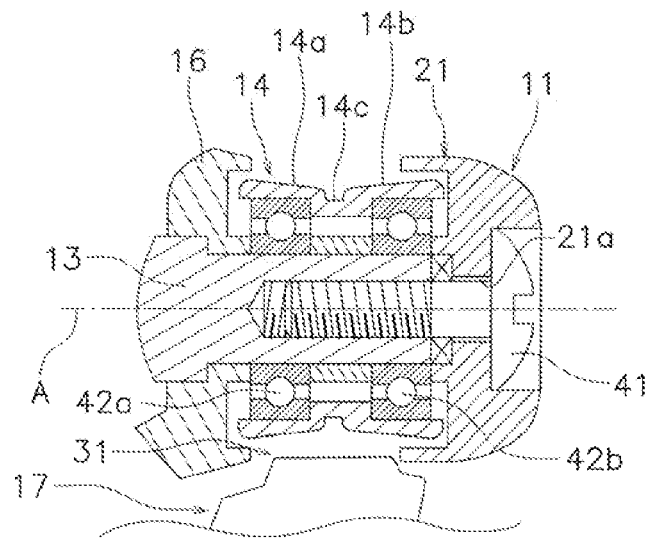
FIG. 2 is a cross-sectional view of a line guide mechanism.
Figure 3:
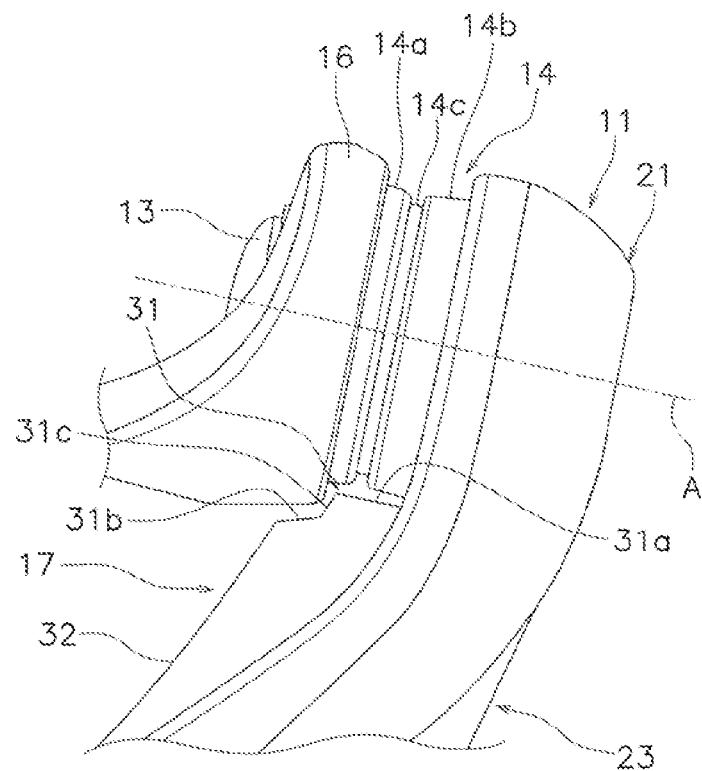
FIG. 3 is a perspective view of a line guide mechanism.
Figure 4:
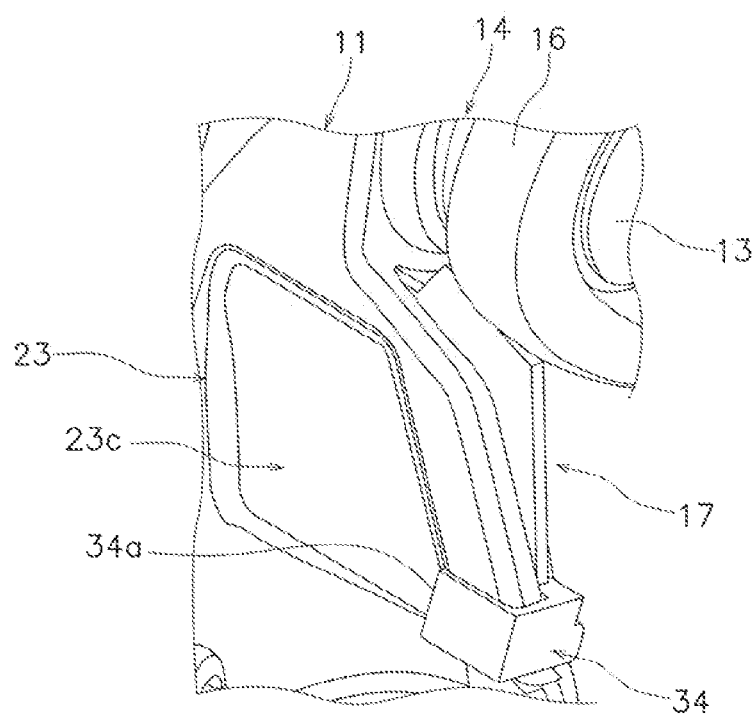
FIG. 4 is a perspective view of a line guide mechanism.

FIG. 2 is a cross-sectional view of the line guide mechanism 6. FIGS. 3 and 4 are perspective views of the line guide mechanism 6. As shown in FIGS. 1 to 4, the line guide mechanism 6 includes a first bail support member 11, a second bail support member 12, a fixed shaft 13, a line roller 14, a bail 15, a cover member 16 and a projection member 17. In the following description, the direction in which an axis A of the fixed shaft extends is defined as the axial direction, the direction orthogonal to the axial direction is defined as the radial direction and the direction around the axis A is defined as the circumferential direction.

The first bail support member 11 is movably attached to the end of the first rotor arm 4b. The second bail support member 12 is movably attached to the end of the second rotor arm 4c.

Figure 5:
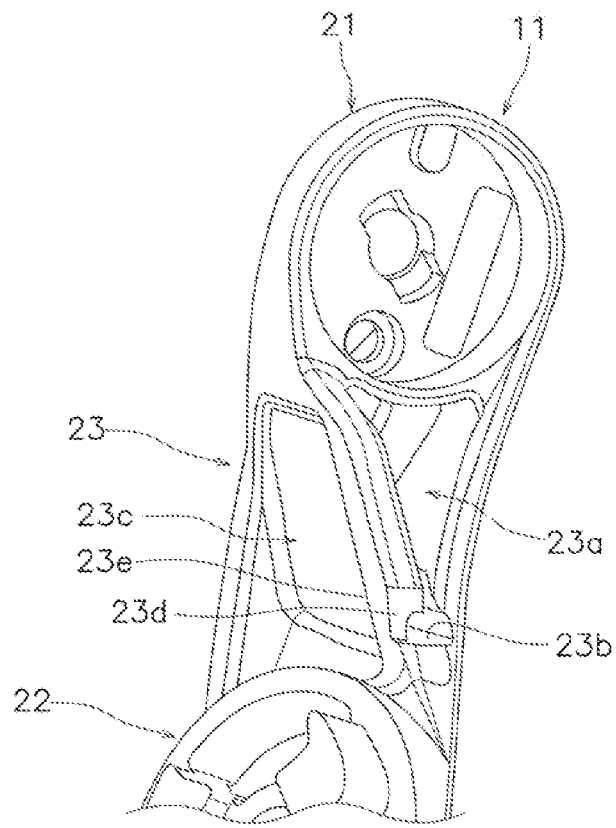
FIG. 5 is a perspective view of a first bail support member.

FIG. 5 is a perspective view of the first bail support member 11. The first bail support member 11 includes a cover part 21, an attachment part 22 and an extension part 23. The cover part 21 is arranged on the front end of the first bail support member 11. The cover part 21, as shown in FIG. 2, covers a part of the line roller 14. The cover part 21 has a through hole 21a which penetrates in the axial direction.

The attachment part 22 is arranged on the rear end of the first bail support member 11. The attachment part 22 is movably attached on the first rotor arm 4b.

The extension part 23 extends in the front-rear direction and connects the cover part 21 and the attachment part 22. The extension part 23 includes a housing part 23a and a groove 23b. The housing part 23a is disposed inside the extension part 23 facing the outer peripheral surface of the spool 3. The housing part 23a is opened in the axial direction from the first bail support member 11 side towards the cover member 16 side. The housing part 23a extends in the front-rear direction. The housing part 23a is formed so that the width of the opening is larger in the direction of the cover part 21 from the attachment part 22.

The groove 23b is disposed on the rear end side of the housing part 23a. The groove 23b is connected to the housing space of the housing part 23a. The groove 23b extends in the axial direction. The groove 23b is formed so that the cross-sectional surface orthogonal to the axial direction is in a T-shape. The groove 23b is opened in the direction towards the outer peripheral surface of the spool 3.

The fixed shaft 13 is fixed to the first bail support member 11. In detail, as shown in FIG. 2, the fixed shaft 13 is screwed to the first bail support member 11 with the fixing bolt 14 which is inserted from the through hole 21a of the first bail support member 11, and fixed on the first bail support member 11. The fixed shaft 13 penetrates the cover member 16 in the axial direction.

The line roller 14 is rotatably supported by the fixed shaft 13, and guides the fishing line to the spool 3. In detail, the line roller 14 is supported by the fixed shaft 13 via the axle bearings 42a, 42b attached to the fixed shaft 13, and rotates around the axis A.

The line roller 14 includes a first cylindrical portion 14a and a second cylindrical portion 14b and a line guiding groove 14c. The first cylindrical portion 14a is arranged close to the cover member 16. The first cylindrical portion 14a extends in the axial direction. The outer peripheral surface of the first cylindrical portion 14a extends linearly so that the outer diameter is smaller approaching the line guiding groove 14c. The axle bearing 42a is arranged on the inner periphery of the first cylindrical portion 14a.

The second cylindrical portion 14b is arranged close to the first bail support member 11. The second cylindrical portion 14b extends in the axial direction. The outer end of the cylindrical portion 14b is covered by the cover part 21. The outer peripheral surface of the second cylindrical portion 14b extends linearly so that the outer diameter is smaller approaching the line guiding groove 14c. The axle bearing 42b is arranged on the inner periphery of the second cylindrical portion 14b.

The line guiding groove 14c is arranged between the first cylindrical portion 14a and the second cylindrical portion 14b. The line guiding groove 14c is formed so as to be recessed radially inward of the outer peripheral surface of the first cylindrical portion 14a and the outer peripheral surface of the second cylindrical portion 14b. The line guiding groove 14c extends in the circumferential direction.

The bail 15 has a shape in which a wire is curved in substantially a U shape. One end of the bail 15 is supported by the first bail support member 11 via the fixed shaft 13 and the other end is supported by the second bail support member 12. The bail 15 is movably supported by the first bail support member 11 and the second bail support member 12 and guides the fishing line to the line roller 14.

The cover member 16 is disposed on one end of the bail 15 and covers a part of the line roller 14. The cover member 16 is substantially cylindrical and fixed on one end of the bail 15. As shown in FIG. 2, the outer diameter of the cover member 16 is larger than the outer diameter of the first cylindrical portion 14a. The cover member 16 is arranged so as to cover the outer edge of the first cylindrical portion 14a. The outer peripheral surface 16a of the cover member 16 guides the fishing line to the line roller 14.

Figure 6:
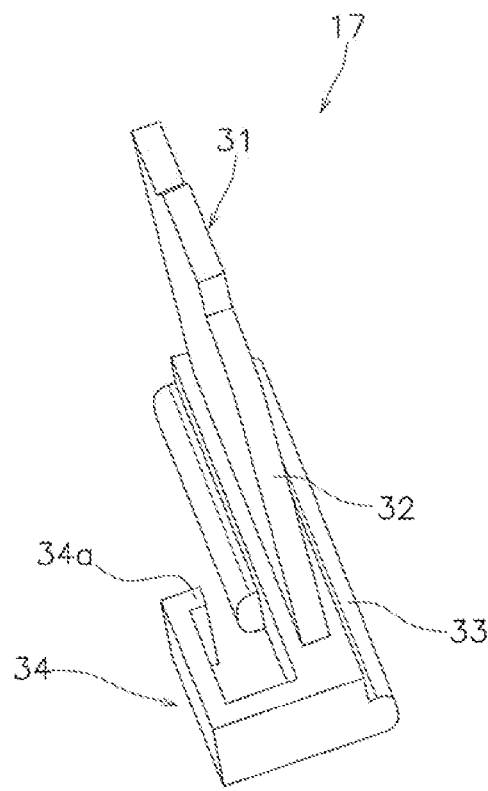
FIG. 6 is a perspective view of a projection member.

FIG. 6 is a perspective view of the projection member 17. The projection member 17 is disposed on the first bail support member 11. In detail, the projection member 17 is substantially plate-shaped and detachably attached to the first bail support member 11.

The projection member 17 includes a line slack prevention portion 31, a line guiding part 32, an insertion part 33 and an arm 34.

The line slack prevention portion 31, as shown in FIG. 3, is formed in steps in the axial direction. The line slack prevention portion 31 has a finned shape and a part of the line slack prevention portion 31 is housed in the housing part 23a. The line slack prevention portion 31 is capable of bending when pushed by the fishing line. In detail, line slack prevention portion 31 is formed of a resin with low rigidity, for example. When the line slack prevention portion 31 is pushed by a knot in the fishing line, it is possible for the line slack prevention portion 31 to bend in the width direction of the housing part 23a. In this manner, even when a knot in the fishing line is larger than the gap between the line roller 14 and the line slack prevention portion 31, it is possible to prevent the knot in the fishing line from becoming caught in the gap between the line roller 14 and the line slack prevention portion 31.

The line slack prevention portion 31 includes a first part 31a and a second part 31b and a connecting part 31c. The first part 31a is arranged to face the line roller 14 in the radial direction at a position closer to the axis A of the fixed shaft 13 than the outer peripheral surface 16a of the cover member 16. In detail, the first part 31a is arranged to face the first cylindrical portion 14a, the second cylindrical portion 14b and the line guiding groove 14c in the radial direction. The first part 31a extends substantially parallel to the axial direction. A gap is disposed between the first part 31a and the line roller 14.

Figure 7:
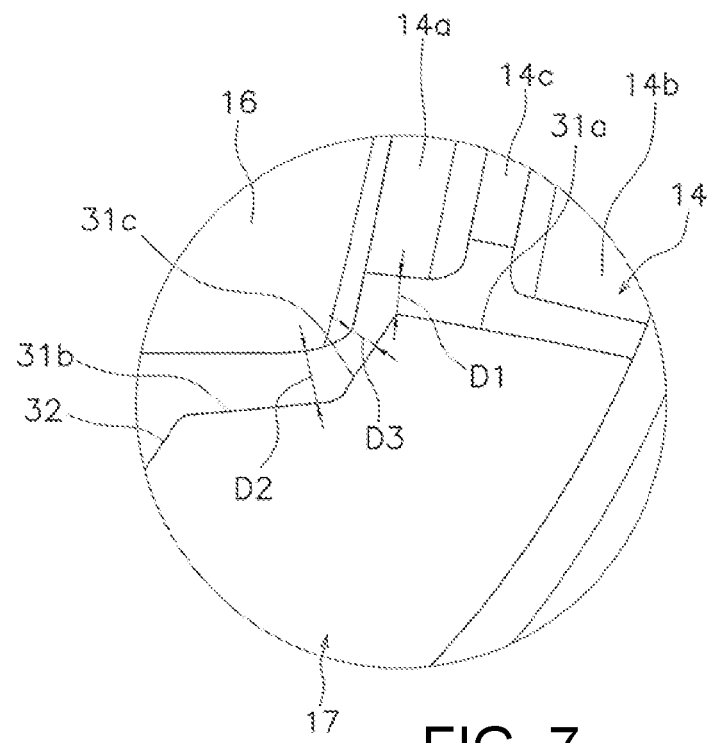
FIG. 7 is an enlarged view of the area around a line slack prevention portion.

FIG. 7 is an enlarged view of the area around the line slack prevention portion 31 illustrated in FIG. 3. The shortest distance D1 between the line roller 14 and the first part 31a is equal to or less than 1 mm. It is more preferable that the shortest distance between the first cylindrical portion 14a and the first part 31a is equal to or less than 1 mm. It is even more preferable that the longest distance between the first cylindrical portion 14a and the first part 31a is equal to or less than 1 mm. That is, it is even more preferable that the gap between the first cylindrical portion 14a and the first part 31a is equal to or less than 1 mm entirely. Additionally, it is preferable that the shortest distance between the second cylindrical portion 14b and the first part 31a is also equal to or less than 1 mm and it is even more preferable that the gap between the second cylindrical portion 14b and the first part 31a is equal to or less than 1 mm entirely.

The second part 31b is arranged to face the cover member 16 at the location further away from the axis A in the radial direction than the part portion 31a. The second part 31b extends in the direction approaching the axis A as is approaches the first part 31a. The shortest distance D2 between the cover member 16 and the second part 31b is equal to or less than 1 mm. It is more preferable that the gap between the cover member 16 and the second part 31b is equal to or less than 1 mm entirely.

The connecting part 31c is arranged between the first part 31a and the second part 31b and connects the first part 31a and the second part 31b. The shortest distance D3 between the connecting part 31c and the cover member 16 is equal to or less than 1 mm. It is more preferable that the gap between the connecting part 31c and the cover member 16 is equal to or less than 1 mm in its entirety.

The line guiding part 32 guides the fishing line to the line roller 14. The line guiding part 32 extends in the direction towards the line roller 14. The line guiding part 32 is connected to the second part 31b of the line slack prevention portion 31.

The insertion part 33 has a shape that corresponds to the groove 23b and is detachably inserted into the groove 23b. Since the insertion part 33 is engaged with the groove 23b, the movement of the projection member 17 in the radial direction is restricted.

As shown in FIG. 6, the arm portion 34 is disposed on one end of the insertion part 33. The arm portion 34 is formed to clasp a part of the first bail support member 11. In detail, the arm portion 34 is substantially C shaped and formed to clasp a part of a wall portion 23c which partitions the housing part 23a of the first bail support member 11. As shown in FIGS. 4 and 5, the base end of the arm portion 34 is engages the recess 23d disposed on the wall portion 23c. The recess 23d is formed so as to be recessed in the axial direction at a position adjacent to the opening of the groove 23b. The end of the arm portion 34 engages the engaging part 23e provided on the wall portion 23c. The engaging part 23e is formed so as to be recessed in the direction towards the housing part 23a on the wall portion 23c. An engaging protrusion 34a is disposed on the end of the arm portion 34, to prevent the projection member 17 from falling out from the groove 23b since the engaging protrusion 34a engages the engaging part 23e.

In the line guide mechanism 6 of the spinning reel 100 having the above configuration, the line slack-prevention portion 31 is formed in steps in the axial direction of the fixed shaft by the first part 31a and the second part 31b of the line slack prevention portion 31, and thus, it is possible to make the gap between the line roller 14 and the line slack prevention portion 31 relatively small. In this manner, a fishing line that has separated from the line roller 14 is pulled by the line slack prevention portion 31, and thus, it is possible to prevent the fishing line from being wound around the spool in a looped condition. Additionally, since the second part 31b is arranged to face the cover member 16, it is possible to prevent the fishing line that has separated from the line roller 14 from being entangled with the first bail support member 11 or the spool 3.

Also, since the line slack prevention portion 31 is formed in steps in the axial direction of the fixed shaft 13, the entry path of the fishing line from the bail 15, the cover member 16 or the line guiding part 32 to the line roller 14 is not linear. Furthermore, the shortest distance D1 between the line roller 14 and the first part 31a is equal to or less than 1 mm and the shortest distance D3 between the connecting part 31c and the cover member 16 is equal to or less than 1 mm. Therefore, with the line guide mechanism 6, line slack is less likely to occur compared to a conventional mechanism. When the gap between the first cylindrical portion 14a and the first part 31a and the gap between the cover member 16 and the second part 31b are equal to or less than 1 mm, line slack is even less likely to occur.

Here, the gap between the line slack prevention portion 31 and the line roller 14 can effectively prevent line slack changes in accordance with the diameter of the fishing line wound on the spool 3. In this embodiment, the projection member 17 is detachably attached to the first bail support member 11. Therefore, when the diameter of the fishing line to be used is changed, it is possible to adjust the gap between the line roller 14 and the line slack prevention portion 31 by attaching another projection member differing solely in the length to the first bail support member 11. In this manner, with the line guide mechanism 6, it is possible to effectively suppress line slack even when the diameter of the fishing line to be used is changed.

Other Embodiment

In the above, one embodiment of the present invention is described, however, the invention is not limited to the above-mentioned embodiment and various changes are possible within the scope that does not deviate from the gist of the invention. Specifically, the plurality of embodiments recited in the specification can be arbitrarily combined if necessary.

In the above-mentioned embodiment, the projection member 17 and the first bail support member 11 are separate components, however, the projection member 17 and the first bail support member 11 can be integrally formed together.

The shape and the material of the projection member 17 are not limited to the above embodiment. For example, the line guiding part 32 can be omitted. Also, the shortest distance D1 between the line roller 14 and the first part 31a does not have to be equal to or less than 1 mm and the shortest distance D2 between the cover member 16 and the second part 31b does not have to be equal to or less than 1 mm. Additionally, the shortest distance D3 between the cover member 16 and the connecting part 31c does not have to be equal to or less than 1 mm.

Figure 8:
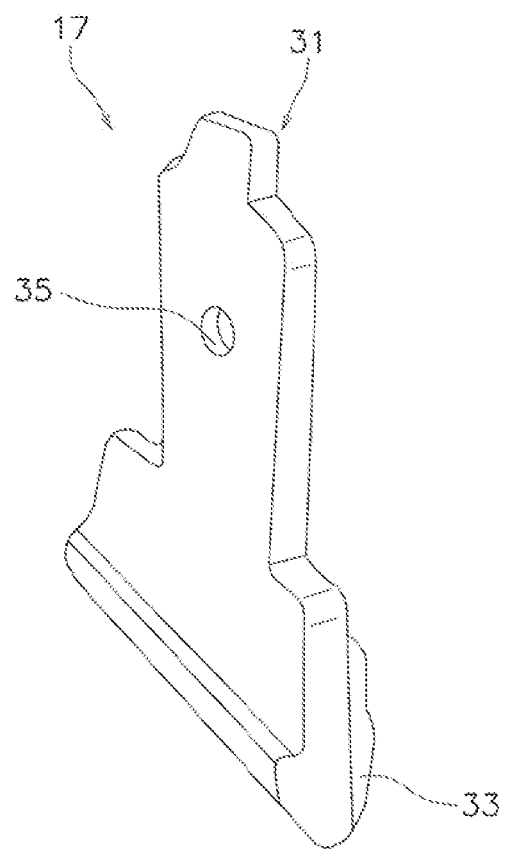
FIG. 8 is a perspective view of a projection member in another embodiment.

In the above-mentioned embodiment, the projection member 17 is prevented from falling off from the first bail support member 11 by engaging the arm 34 of the projection member 17 with the engaging part 23e of the first bail support member 11. However, the arm 34 can be omitted. For example, the projection member 17 can be prevented from falling off from the first bail support member 11 by press-fitting the insertion part 33 into the groove 23b. In this embodiment, as shown in FIG. 8, a hook part 35 to which a tool is hooked, which is for pulling out the insertion part 33 from the groove 23b, can be disposed on the projection member 17. The hook part 35 can be a through hole which penetrates in the axial direction, for example.

Figure 9:
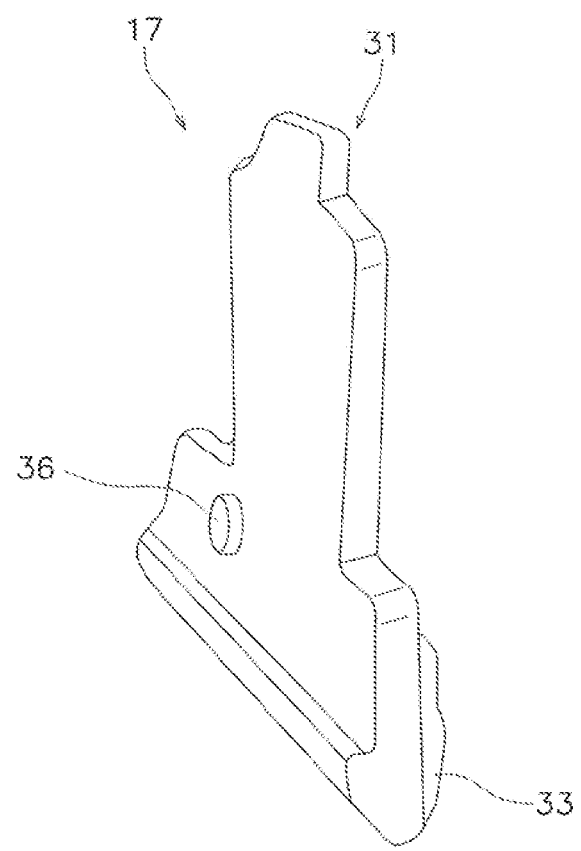
FIG. 9 is a perspective view of a projection member in another embodiment.
Figure 10:
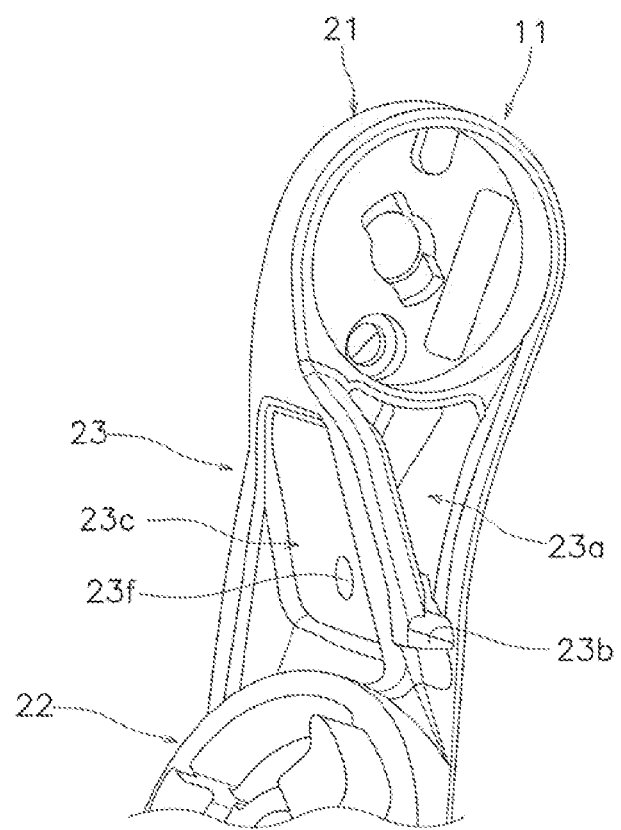
FIG. 10 is a perspective view of a first bail support member in another embodiment.

By providing a protrusion projecting in the direction different from the axial direction on one of the first bail support member 11 and the projection member 17 and providing a hole to which the protrusion engages on the other one of the first bail support member 11 and the projection member 17, the projection member 17 can be prevented from falling off from the first bail support member 11 by the protrusion and the hole. For example, as shown in FIGS. 9 and 10, it is possible to provide a protrusion 36 on the insertion part 33 of the projection member 17 and to provide a hole 23f which engages with the protrusion 36 on the wall portion 23c of the first bail support member 11.

Figure 11:
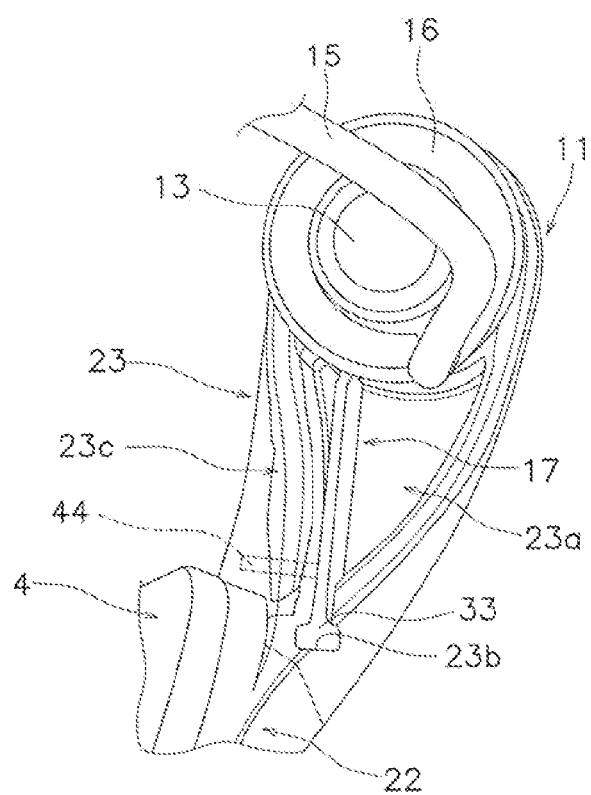
FIG. 11 is a perspective view of a line guide mechanism in another embodiment.
Figure 12:
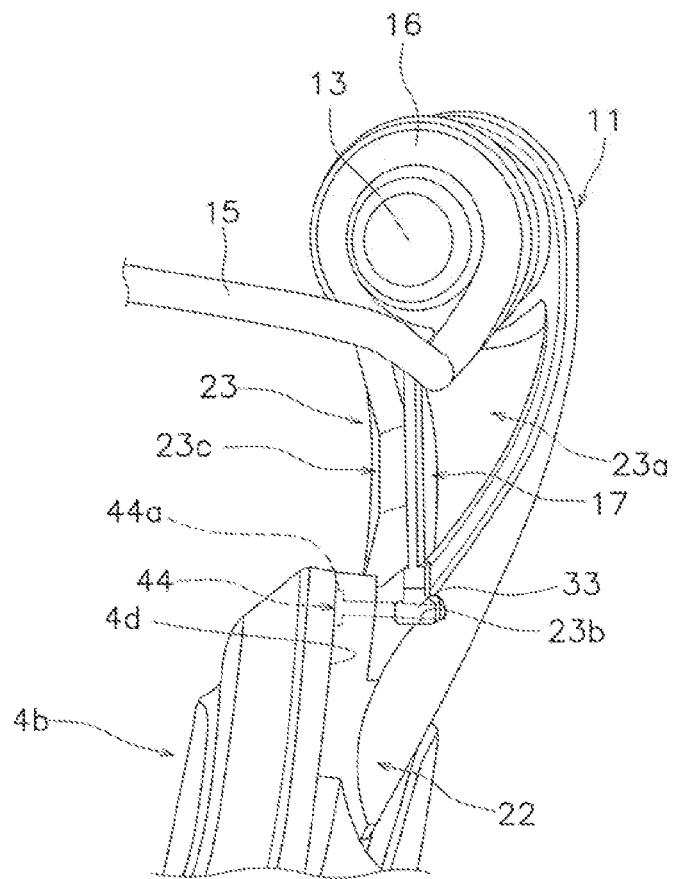
FIG. 12 is a perspective view of a line guide mechanism in another embodiment.

The projection member 17, as shown in the FIG. 11, can be prevented from falling off from the first bail support member 11 by a stopper 44 inserted into the first bail support member 11 from the direction different from the axial direction. The stopper 44 can be a set screw, for example, and inserted from an insertion hole, which is not shown, provided on the wall portion 23c of the first bail support member 11. Alternatively, the stopper 44, as shown in the FIG. 12, may be a pin member that has a head part 44a. In this case, the head part 44a of the stopper 44 may be held down by the mating surface 4d between the first rotor arm 4b and the attachment part 22 of the first bail support member 11.

Figure 13:
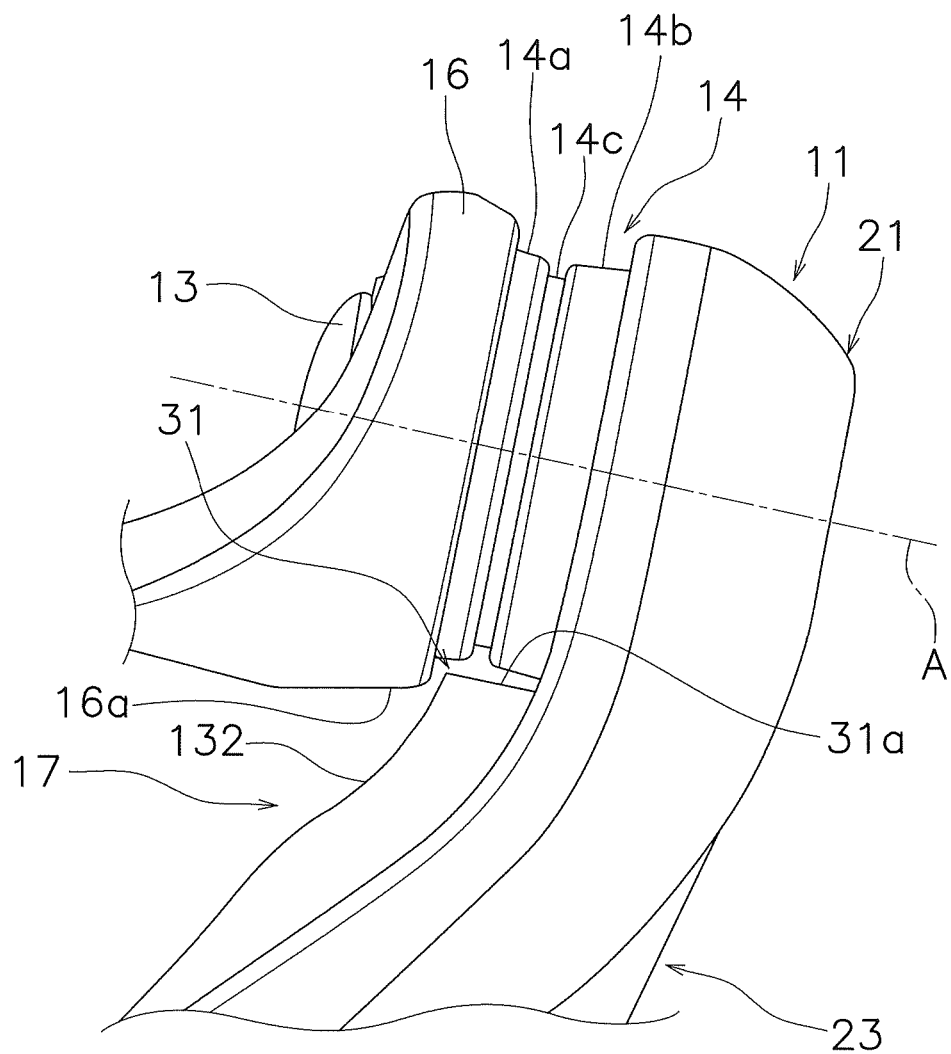
FIG. 13 is a perspective view of a line guide mechanism in another embodiment.

The second part 31b of the line slack prevention portion 31 can be omitted. In this embodiment, as shown in the FIG. 13 for example, the line guiding part 132 can be connected to the first part 31a of the line slack prevention portion 31. In this case, it is preferable that the shortest distance between the cover member 16 and the line guiding part 132 is equal to or less than 1 mm.

What is claimed is:

1. A line guide mechanism for a spinning reel, configured to be movably connected to a pair of rotor arms and guide a fishing line to a spool, comprising:
a bail support member movably connected to one of the pair of rotor arms;
a fixed shaft fixed to the bail support member;
a line roller rotatably supported by the fixed shaft, configured to guide the fishing line to the spool and including a guiding groove;
a bail having an end supported by the bail support member via the fixed shaft and configured to guide the fishing line to the line roller;
a cover member disposed on the end of the bail and configured to cover a part of the line roller; and
a projection member disposed on the bail support member and having a line slack prevention portion which includes a first part extending in an axial direction of the fixed shaft, so as to be oppositely disposed to an entirety of the guiding groove, and arranged facing the line roller in a radial direction of the fixed shaft at a position closer to an axis of the fixed shaft than an outer peripheral surface of the cover member.

2. The line guide mechanism for the spinning reel according to claim 1, wherein
a shortest distance between the e roller and the first part is equal to or less than 1 mm.

3. The line guide mechanism for the spinning reel according to claim 1, wherein
the projection member further comprises a second part arranged facing the cover member at a position farther from the axis of the fixed shaft than the first part in the radial direction of the fixed shaft.

4. The line guide mechanism for the spinning reel according to claim 3, wherein
a shortest distance between the cover member and the connecting part is equal to or less than 1 mm.

5. A line guide mechanism for the spinning reel, configured to be movably connected to a pair of rotor arms and guide a fishing line to a spool, comprising:
a bail support member movably connected to one of the pair of rotor arms;
a fixed shaft fixed to the bail support member;
a line roller rotatably supported by the fixed shaft and configured to guide the fishing line to the spool;
a bail having an end supported by the bail support member via the fixed shaft and configured to guide the fishing line to the line roller;
a cover member disposed on the end of the bail and configured to cover a part of the line roller; and
a projection member disposed on the bail support member and having a line slack prevention portion which includes a first part extending in an axial direction of the fixed shaft and arranged facing the line roller in a radial direction of the fixed shaft at a position closer to an axis of the fixed shaft than an outer peripheral surface of the cover member,
the line slack prevention portion having a finned shape and being capable of bending when pushed by the fishing line.

6. A line guide mechanism for a spinning reel, configured to be movably connected to a pair of rotor arms and guide a fishing line to a spool, comprising:
a bail support member movably connected to one of the pair of rotor arms;
a fixed shaft fixed to the bail support member;
a line roller rotatably supported by the fixed shaft and configured to guide the fishing line to the spool;
a bail having an end supported by the bail support member via the fixed shaft and configured to guide the fishing line to the line roller, the bail support member having a groove extending in the axial direction of the fixed shaft;
a cover member disposed on the end of the bail and configured to cover a part of the line roller; and
a projection member disposed on the bail support member and having a line slack prevention portion which includes a first part extending in an axial direction of the fixed shaft and arranged facing the line roller in a radial direction of the fixed shaft at a position closer to an axis of the fixed shaft than an outer peripheral surface of the cover member, the projection member including an insertion part configured to be inserted into the groove and detachably attached to the bail support member.

7. The line guide mechanism for the spinning reel according to claim 6, wherein
the insertion part is configured to be press-fit into the groove, and
the projection member includes a hook part to which a tool is capable of being hooked, so as to be pulled out the insertion part from the groove.

8. The line guide mechanism for the spinning reel according to claim 7, further comprising
a stopper configured to be inserted into the bail support member from a direction different from the axial direction of the fixed shaft and prevent the insertion part from falling out of the groove.

9. The line guide mechanism for the spinning reel according to claim 8, wherein
the stopper is a pin member having a head part; and
the head part is configured to be held between the mating surfaces of the one of the pair of rotor arms and the bail support member.

10. The line guide mechanism for the spinning reel according to claim 6, wherein
one of the bail support member and the projection member has a protrusion which projects in a direction different from the axial direction,
an other one of the bail support member and the projection member has a hole with which the protrusion is capable of engaging, and
the engagement between the protrusion and the hole is configured to prevent the projection member from falling off from the bail support member.

11. The line guide mechanism for the spinning reel according to claim 6, wherein
the projection member further comprises an arm configured to clasp a part of the bail support member on one end of the insertion part, and
the bail support member includes an engaging part to which an end of the arm is configured to engage.

* * * * *